United States Patent
Asano et al.

(10) Patent No.: US 7,818,546 B2
(45) Date of Patent: Oct. 19, 2010

(54) PIPELINE PROCESSING COMMUNICATING ADJACENT STAGES AND CONTROLS TO PREVENT THE ADDRESS INFORMATION FROM BEING OVERWRITTEN

(75) Inventors: Shigehiro Asano, Kanagawa (JP); Takashi Yoshikawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 872 days.

(21) Appl. No.: 11/517,327

(22) Filed: Sep. 8, 2006

(65) Prior Publication Data

US 2007/0198758 A1 Aug. 23, 2007

(30) Foreign Application Priority Data

Feb. 20, 2006 (JP) .............................. 2006-043182

(51) Int. Cl.
*G06F 9/00* (2006.01)
*G06F 7/38* (2006.01)
*G06F 9/44* (2006.01)
*G06F 13/00* (2006.01)

(52) U.S. Cl. ...................................... 712/220; 710/110
(58) Field of Classification Search .................. 712/220
See application file for complete search history.

(56) References Cited

U.S. PATENT DOCUMENTS

| 5,748,613 A | 5/1998 | Kilk et al. |
| 6,657,955 B1 * | 12/2003 | Bonneau et al. ............. 370/229 |
| 7,131,017 B2 * | 10/2006 | Schmit et al. ............... 713/323 |
| 7,249,242 B2 * | 7/2007 | Ramchandran ............. 712/220 |

FOREIGN PATENT DOCUMENTS

| JP | 5-53806 | 3/1993 |
| JP | 6-83731 | 3/1994 |
| JP | 6-149731 | 5/1994 |
| JP | 2001-167049 | 6/2001 |
| JP | 2001-306546 | 11/2001 |
| JP | 2003-157227 | 5/2003 |

OTHER PUBLICATIONS

Notice of Rejection issued by the Japanese Patent Office on May 11, 2010, for Japanese Patent Application No. 2006-043182, and English-language translation thereof.

* cited by examiner

*Primary Examiner*—Chun-Kuan Lee
*Assistant Examiner*—Brooke J Dews
(74) *Attorney, Agent, or Firm*—Finnegan, Henderson, Farabow, Garrett & Dunner, L.L.P.

(57) ABSTRACT

A bus apparatus for transferring information between a bus master and a bus slave includes a plurality of pipeline registers capable of transmitting information from the bus master to the bus slave by a pipeline processing; and a plurality of management devices that manage each pipeline register. Also, the management device includes: a holding state keeping unit that keeps a holding state as information indicating whether a current stage's pipeline register corresponding to the management device holds information; an adjacent stage's holding state specifying unit that specifies the holding state of a previous stage's pipeline register that transmits information to the current stage's pipeline register and the holding state of a subsequent stage's pipeline register to which information from the current stage's pipeline register is transmitted; and a transfer control unit that determines whether information held by the corresponding pipeline register is transferred.

12 Claims, 9 Drawing Sheets

FIG.5

| pstat<br>PREVIOUS STAGE | cstat<br>CURRENT STAGE | fstat<br>SUBSEQUENT STAGE | sel | next |
|---|---|---|---|---|
| e  (0) | e | e | 0 | e |
| f  (1) | e | e | 1 | f |
| f | e | f | 1 | f |
| f | f | e | 0 | e |
| f | f | f | 0 | f |
| e | e | f | 0 | e |
| e | f | e | 0 | e |
| e | f | f | 0 | f |

FIG.8

| Cprio | cstatf | pstatA | pstatB | cstatA | cstatB | Sel | nprio |
|---|---|---|---|---|---|---|---|
| x | f | x | x | f | f | x | keep |
| x | e | e | f | e | e | B | A |
| x | e | f | e | e | e | A | B |
| A | e | f | f | e | f | A | B |
| B | e | f | f | f | e | B | A |
| x | e | e | e | e | e | x | keep |

INPUT (Cprio, cstatf, pstatA, pstatB) / OUTPUT (cstatA, cstatB, Sel, nprio)

PIPELINE PROCESSING COMMUNICATING ADJACENT STAGES AND CONTROLS TO PREVENT THE ADDRESS INFORMATION FROM BEING OVERWRITTEN

CROSS-REFERENCE TO RELATED APPLICATIONS

This application is based upon and claims the benefit of priority from the prior Japanese Patent Application No. 2006-043182, filed on Feb. 20, 2006; the entire contents of which are incorporated herein by reference.

BACKGROUND OF THE INVENTION

1. Field of the Invention

The present invention relates to a bus apparatus, bus system and information transferring method for transferring information between a bus master and a bus slave.

2. Description of the Related Art

An operation frequency in a system has been improved along with improvement in a semiconductor technique. However, it is difficult to assure that a delay due to wiring is reduced in accordance with the improvement in operation frequency. Particularly, when a wiring is formed on a semiconductor substrate, a line width between wirings becomes narrower due to miniaturization, and increase in a resistance value of the wiring based thereon may exceed a shrink effect of the wiring capacity, which does not mean that the delay reduces according to the amount of miniaturization.

There has been widely used a system-on-silicon in which a plurality of processors, a memory and an I/O device are integrated on a semiconductor substrate to constitute a system. However, it is difficult to transmit a signal from the processor to the memory or I/O device during one cycle due to the improvement in frequency and the above miniaturized wiring delay.

In a conventional method, when the processor and the memory or I/O device are connected via a bus, information on whether the memory or I/O device can accept an address is first transmitted to the processor. Then, the processor transmits the address based on the information. However, along with the improvement in operation frequency, the connection between the processor and the memory or I/O device cannot be transmitted during one cycle, and the transmission may require several cycles.

In the field of communication, it is assumed that a transmission source and a reception destination are distant from each other and several cycles are required for transmitting information. In order to improve the frequency in the system, for example, a certain amount of buffer is provided at the reception destination and a credit value corresponding to the amount of buffer is managed at the transmission source for preventing overflow of the buffer at the reception side (for example, see U.S. Pat. No. 5,748,613 Specification).

When the connection between the processor and the memory or I/O device cannot be transmitted during one cycle and may require several cycles as described above, it is necessary to introduce a pipeline structure between the processor and the memory.

Even in this case, several cycles are required for returning a signal indicating that the memory or I/O device cannot accept the address to the processor. Therefore, even when the pipeline structure is introduced, if the signal indicating that the address cannot be accepted is transmitted to the processor, a plurality of items of address information may have been previously sent out from the processor.

On the other hand, in the communication according to the above credit method, when a command is sent from the transmission source to the reception destination at a certain interval, it is necessary to prepare a buffer according to its latency, which consumes extra resource.

For example, it is assumed that "t" cycles are required both from a bus master to a bus slave and from a bus slave to a bus master. In this case, 2t cycles will be required until a value of a credit present at the bus master is updated. In other words, when the bus master can send a command once per n cycles, a buffer for 2t/n commands has to be present at the slave. On the contrary, when only one buffer is present, a command can be sent only once per 2t cycles, which remarkably restricts the band width.

Further, in a conventional method in which a plurality of bus masters send a command to a bus slave, arbiters are typically present in a concentrated manner. However, when the operation frequency of the system is high, a signal may not be transmitted from a plurality of processors to the arbiters during one cycle. In this case, the arbiters are required to be located in a dispersed manner.

On the other hand, as described above, a flow control mechanism is necessary for preventing overwriting on the buffer of the slave (memory or I/O device). Credit information exchange is limited to a pair of bus mater (processor) and slave in the credit-based flow control. Thus, in order to handle a plurality of bus masters, the bus slave has to provide credit management for each bus master and a buffer for each bus master, which consumes resource.

SUMMARY OF THE INVENTION

According to one aspect of the present invention, a bus apparatus for transferring information between a bus master and a bus slave, includes a plurality of pipeline registers capable of transmitting information from the bus master to the bus slave by a pipeline processing; and a plurality of management devices that manage each pipeline register and are provided corresponding to the plurality of pipeline registers, respectively, wherein each of the management devices includes: a holding state keeping unit that keeps a holding state as information indicating whether a current stage's pipeline register corresponding to the management device holds information; an adjacent stage's holding state specifying unit that specifies the holding state of a previous stage's pipeline register that transmits information to the current stage's pipeline register and the holding state of a subsequent stage's pipeline register to which information from the current stage's pipeline register is transmitted; and a transfer control unit that determines whether information held by the corresponding pipeline register is transferred based on the holding state of the current stage's pipeline register kept by the holding state keeping unit, and the holding state of the previous stage's pipeline register and the holding state of the subsequent stage's pipeline register specified by the adjacent stage's holding state specifying unit.

According to another aspect of the present invention, a bus system includes a bas master; a bus slave; and a bus apparatus that transmits information between the bus master and the bus slave, wherein the bus apparatus includes: a plurality of pipeline registers capable of transmitting from the bus master to the bus slave by a pipeline processing; and a plurality of management devices that manage each pipeline register and are provided corresponding to the plurality of pipeline registers, respectively, wherein each of the management devices contains: a holding state keeping unit that keeps a holding state as information indicating whether a current stage's pipeline register corresponding to the management device holds information; an adjacent stage's holding state specifying unit that specifies the holding state of a previous stage's pipeline register that transmits information to the current stage's pipeline register and the holding state of a subsequent stage's pipeline register to which information from the current stage's pipeline register is transmitted; and a transfer control unit that determines whether information held by the corresponding pipeline register is transferred based on the holding state of the current stage's pipeline register kept by the holding state keeping unit, and the holding state of the previous stage's pipeline register and the holding state of the subsequent stage's pipeline register specified by the adjacent stage's holding state specifying unit.

According to still another aspect of the present invention, an information transferring method in a bus apparatus for transferring information between a bus master and a bus slave, wherein the bus apparatus has a plurality of management devices that manage each pipeline register and are provided corresponding to a plurality of pipeline registers capable of transmitting from the bus master to the bus slave by a pipeline processing, respectively, each of the management devices specifies a holding state as information indicating whether a previous stage's pipeline register for transmitting information to a current stage's pipeline register corresponding to the management device holds information, and the holding state of a subsequent stage's pipeline register to which information from the current stage's pipeline register is transmitted, and each of the management devices determines whether to transfer information held by the corresponding pipeline register based on the holding state of the current stage's pipeline register, which is kept by a holding state keeping unit for keeping a holding state as information indicating whether a current stage's pipeline register corresponding to the management device holds information, and the holding state of the previous stage's pipeline register and the holding state of the subsequent stage's pipeline register.

BRIEF DESCRIPTION OF THE DRAWINGS

FIG. 5 is a diagram showing a logic of a flow control logic circuit;

FIG. 8 is a diagram showing a logic of an arbiter circuit;

DETAILED DESCRIPTION OF THE INVENTION

Embodiments of a bus apparatus, bus system and information transferring method according to the present invention will be described below with reference to the drawings. The embodiments will not limit the present invention.

Figure 1:
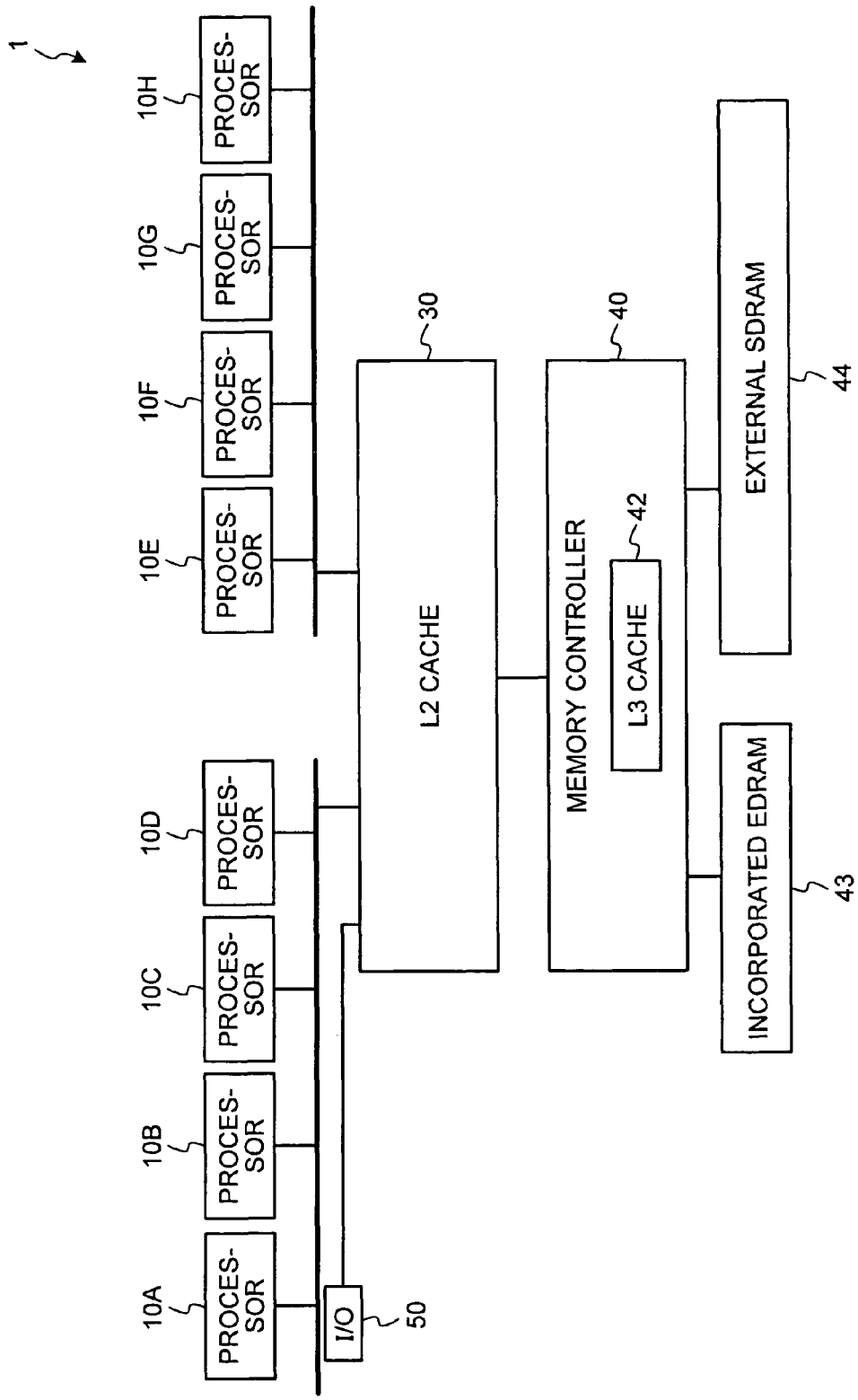
FIG. 1 is a diagram showing the entire construction of a bus system according to an embodiment.

FIG. 1 is a diagram showing the entire construction of a bus system 1 according to an embodiment. The bus system 1 comprises eight processors 10A to 10H, an I/O device 50, a L2 (level 2) cache 30, a memory controller 40, an incorporated EDRAM 43 and an external SDRAM 44. The memory controller 40 has a L3 (level 3) cache 42. The eight processors 10A to 10H are connected to the L2 cache 30. Further, the I/O device 50 is connected to the L2 cache 30. The L2 cache 30 is further connected to the memory controller 40.

Address information is transmitted from the processors 10A to 10H to the L2 cache 30. The L2 cache 30 checks whether information requested from the processors 10A to 10H has been cached by the L2 cache 30, and performs predetermined operation according to the check result. If the information is not be cached, the memory controller 40 accesses the L3 cache 42. When the information is not cached in the L3 cache 42, the memory accesses the incorporated EDRAM 43 and the external SDRAM 44 according to the address. In other words, the eight processors 10A to 10H according to the present embodiment correspond to master devices in the bus. The L2 cache 30 corresponds to a slave device in the bus. The bus system 1 may not have the L3 cache or L2 cache.

The address information includes a type of command (Read, Write or the like), a size of data transfer in addition to a memory address requested from the processors, and these items of information are concurrently transferred.

Figure 2:
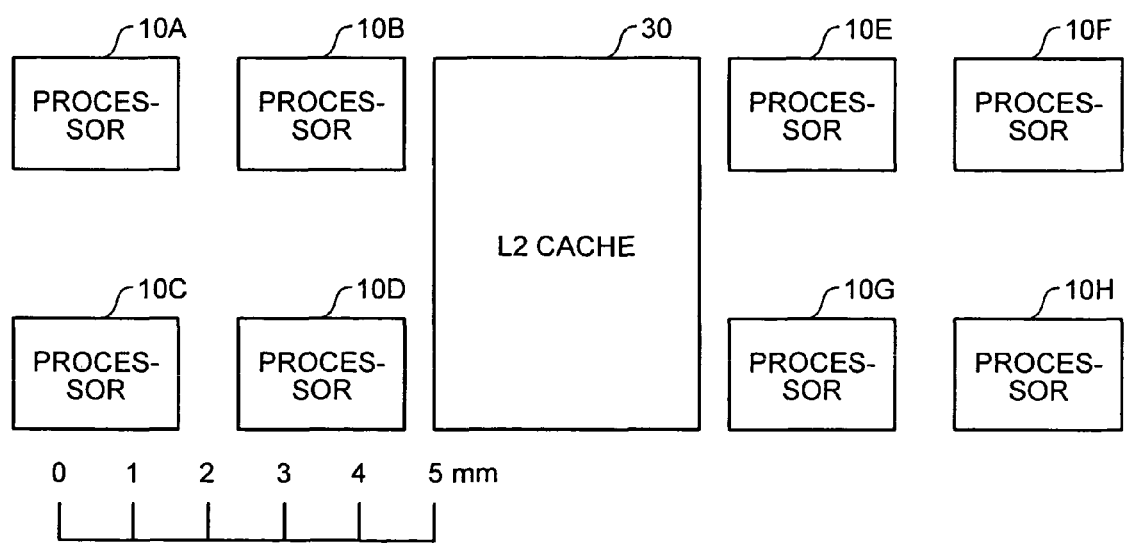
FIG. 2 is a diagram showing a physical positional relationship between processors and a cache.

FIG. 2 is a diagram showing a physical positional relationship between the processors 10A to 10H and the L2 cache 30. As shown in FIG. 2, the processor 10A and the L2 cache 30 are arranged at a distance of about 5 mm. Thus, when it is assumed that the wiring can reach about 2.5 mm during one cycle at the bus's clock cycle of 500 MHz, it is necessary to install a pipeline processing having at least two stages between the processor 10A and the L2 cache 30. Further, in consideration of a margin of a latch or clock skew in the pipeline processing, a pipeline processing having more stages is required.

If the bus is not of the pipeline structure, the following restrictions have to be put. In other words, as one method, the bus frequency remains and the size of the system is restricted such that the system can be reached during one cycle. As another method, the bus frequency is reduced. Since the two restrictions limit the magnitude of the system or limit a bus throughput, an impact on the performance is significant, which is undesirable.

Figure 3:
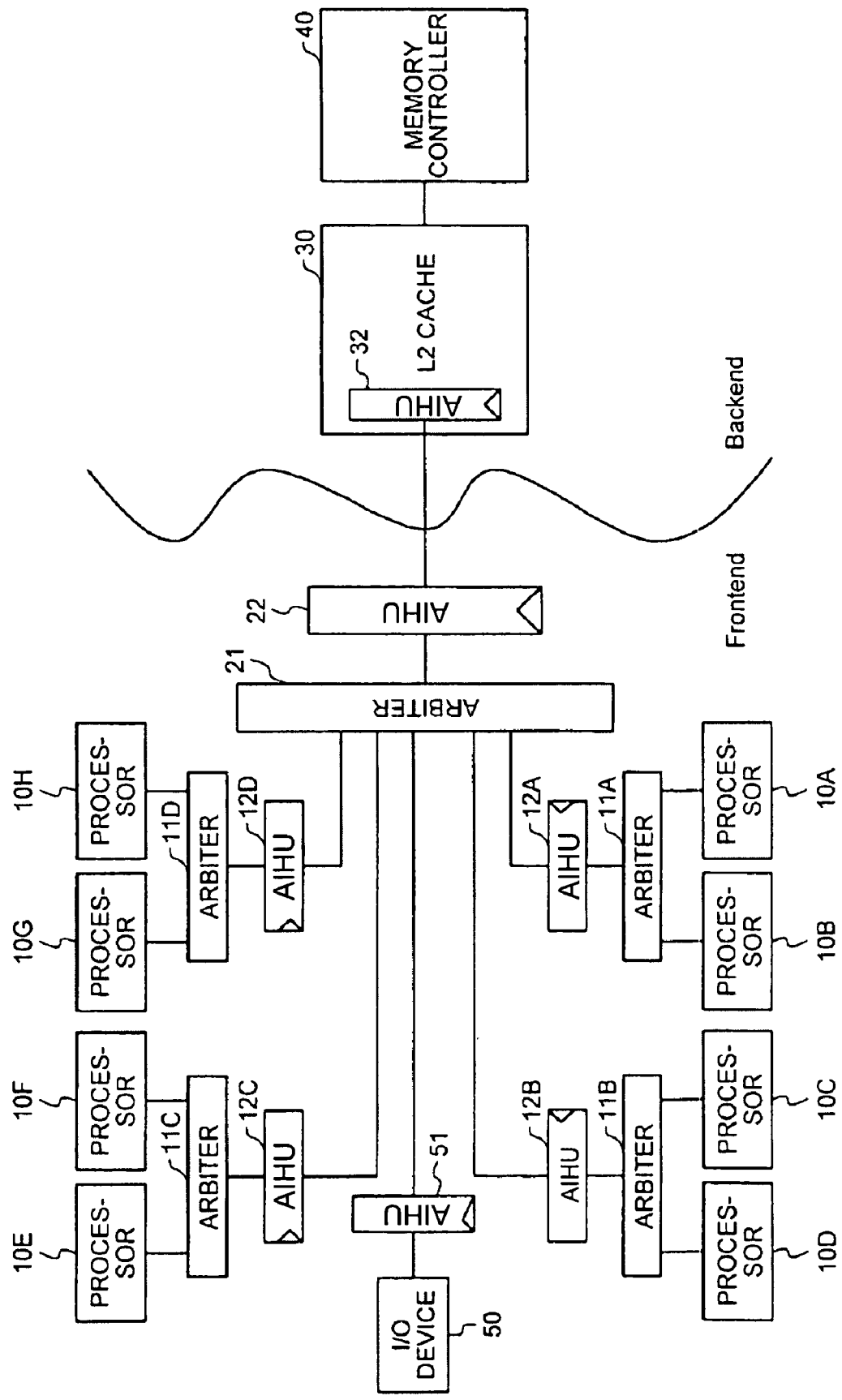
FIG. 3 is a diagram showing a connection relationship between the processors and the cache in more details.

FIG. 3 is a diagram showing the connection relationship between the processors 10A to 10H and the L2 cache 30 in more details. As shown in FIG. 3, the two processors 10A and 10B are connected to an arbiter 11A, and further to a flip-flop configured address information holding unit (AIHU) 12A. Similarly, other processors 10C to 10H are also connected to arbiters 11B to 11D and address information holding units (AIHUs) 12B to 12D. Further, each address information holding unit 12A to 12D is connected to an address information holding unit (AIHU) 22 via an arbiter 21.

In this construction, a two-stage pipeline processing is present between the processors 10A to 10H and the L2 cache 30. The pipeline processing is constituted so that the address information holding unit 12A to 12H of each processor 10A to 10H is assumed as the first stage and the address information holding unit 22 is assumed as the second stage.

The arbiter 21 is further connected to the I/O device 50. In other words, the I/O device 50 accesses the L2 cache 30 via the arbiter 21, too.

The pipeline processing according to this embodiment has two stages, but the number of stages of the pipeline processing may be varied according to the distance between the processors 10 and the L2 cache 30 and the cycle time.

There will be described below a pipeline processing in which the address information holding units (AIHUs) 12A to 12H, the address information holding unit AIHU) 22 and an address information holding unit (AIHU) 32 are assumed as pipeline registers. For simple explanation, there will be described a case where only one processor 10 is connected to the L2 cache 30.

Figure 4:
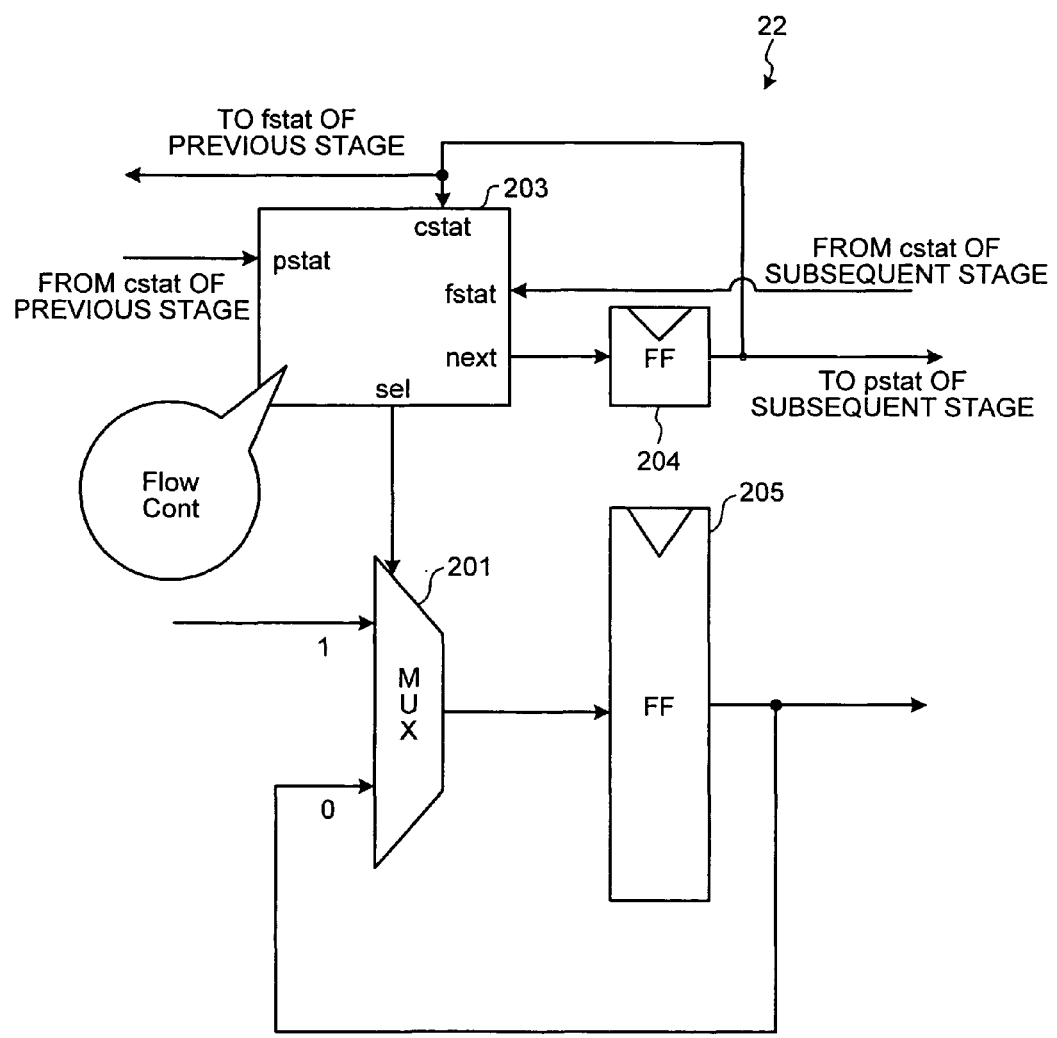
FIG. 4 is a diagram showing a more detailed construction of each stage of a pipeline register.

FIG. 4 is a diagram showing a more detailed structure of the address information holding unit 22. The address information holding unit 22 corresponds to one stage of the pipeline processing. A construction of the other stage of the pipeline processing is also similar. The address information holding unit 22 has a multiplexer (MUX) 201, a latch 205, a logic circuit 203 for performing flow control, and a flip-flop 204. These parts cooperate to realize a holding state keeping unit, an adjacent stage's holding state specifying unit and a transfer control unit of the management device.

The logic circuit 203 has a pstat terminal, a cstat terminal, a fstat terminal, a sel terminal and a next terminal. The next terminal is connected to the one-bit flip-flop 204. The flip-flop 204 keeps a holding state indicating whether it holds address information. When the flip-flop 204 holds the address information, it keeps "f" as the holding state. When the flip-flop 204 does not hold the address information, it keeps "e" as the holding state. "f" and "e" can be typically expressed as "1" and "0", respectively.

The pstat terminal of the logic circuit 203 is connected to the previous stage of the pipeline processing and the state information of the previous stage is input as "f" or "e". The next terminal outputs current stage's state information "f" or "e" to the flip-flop 204. The flip-flop 204 outputs the state information input from the next terminal to the subsequent stage of the pipeline processing.

The information output from the next terminal indicates the current stage's state information during the next cycle. This state information becomes an input of the cstat terminal of the logic circuit 203. The fstat terminal is connected to the subsequent stage of the pipeline processing and the subsequent stage's state information "f" or "e" is input.

The sel terminal is connected to the multiplexer 201 and the multiplexer 201 outputs "0" or "1" information indicating whether the address information will be held or updated. The address information is stored in the latch 205, and the information in the latch 205 is held or updated by the multiplexer 201 according to the flow control. Specifically, when the output of the sel terminal is 0 (when the MUX is 0), the latch 205 holds the address information. In other words, the address information which has been held will be held again. When the output of the sel terminal is 1 (when the MUX is 1), the address information is updated. In other words, the information of the previous stage in the pipeline processing is held.

As described above, in order to reduce consumed power, the address information is changed only on updating, and the contents of the latch 205 are varied. The MUX circuit may be realized by clock gating for the latch in order to reduce consumed power.

The outputs of the next terminal and the sel terminal are determined based on the inputs of the pstat terminal, the cstat terminal and the fstat terminal.

FIG. 5 is a diagram showing a logic of the logic circuit 203. The output values of the next terminal and the sel terminal are determined by the logic shown in FIG. 5. For example, in the case of pstat=f, cstat=e and fstat=e at the second line of FIG. 6, sel=1 and next=f are assumed. In other words, the previous stage's information is put into the current stage and the current stage's state is changed to "f".

In the case of pstat=e, cstat=f and fstat=e at the seventh line, sel=0 is assumed. In other words, the current stage's information is maintained as in the previous cycle. This is because it is not necessary to input new information into the current stage since there is no information in the previous stage of the pipeline processing and because the same information as in the previous cycle is kept in order to reduce consumed power.

Figure 6:
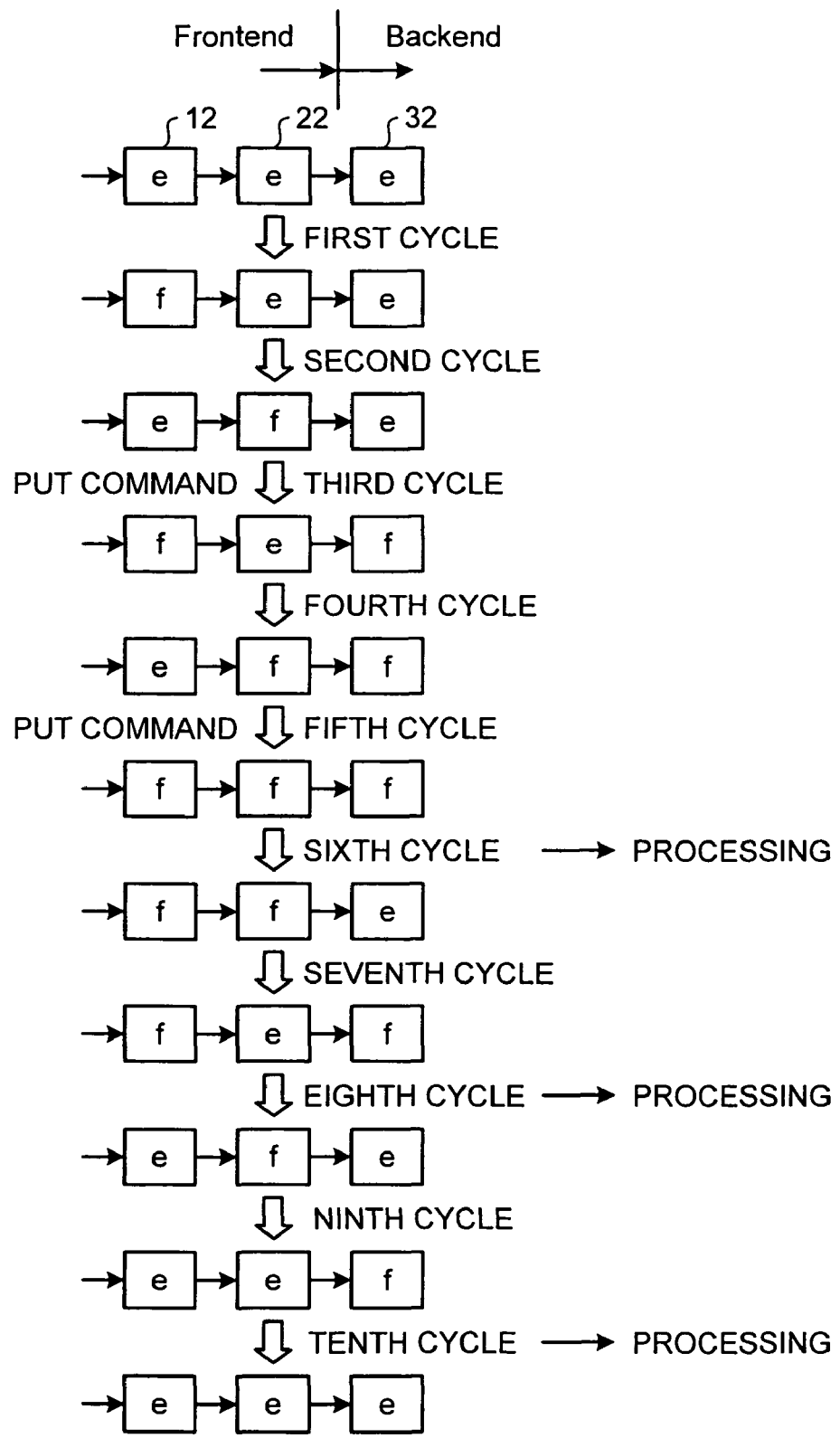
FIG. 6 is a diagram for explaining an operation of the pipeline register according to the logic of FIG. 5.

FIG. 6 is a diagram for explaining an operation of the pipeline processing by the logic of FIG. 5. There is shown how the holding state of each pipeline register changes with time from the top to the bottom in FIG. 6. As shown in FIG. 6, there is constituted a pipeline processing in which the address information holding unit 12, the address information holding unit 22 and the address information holding unit 32 are assumed as pipeline registers.

Here, the address information holding unit 12, the address information holding unit 22 and the address information holding unit 32 are called the first stage, the second stage and the third stage, respectively. The address information holding unit 12 side or processor side is assumed as Frontend and the L2 cache 30 side is assumed as Backend. Each pipeline register keeps its or its stage's holding state.

There will be described an operation when the address information is sent out from the processor 10 and this address information is transferred to the L2 cache 30. According to the logic of FIG. 5, the processor 10 can send out the address information only when the first stage is "e". The address information is transferred to the L2 cache 30 when the third stage is "f".

As shown in the uppermost stage in FIG. 6, in the initial state, none of the first to third stages has the address information and they keep the holding state "e". At this time, since the holding state of the first state is "e", the processor 10 can send out the address information based on the logic of FIG. 5. When the processor 10 sends out the address information, a command is put into the first stage and the holding state of the first stage is changed from "e" to "f". In the second cycle, the address information held by the first stage is sent out to the second stage. Accordingly, the holding state of the second stage is changed from "e" to "f" and the holding state of the first stage is changed from "f" to "e".

Each stage can refer to only the holding states of adjacent stages. Thus, the address information can be sent out from the processor 10 once per 2 cycles. Accordingly, the next address information is sent out and the holding state of the first stage is changed from "e" to "f" in the third cycle. In the third cycle, the address information in the second stage is sent out to the third stage, the holding state of the third stage is changed from "e" to "f" and the holding state of the second stage is changed from "f" to "e".

When the L2 cache 30 is performing some processings such as update of tag information or access to the incorporated EDRAM 43 or external SDRAM 44, it does not accept the address information. Thus, the address information is accumulated at the Backend side of the pipeline processing with time. In the example shown in FIG. 6, the holding state becomes fff in the fifth cycle. In this state, the processor 10 cannot send out the address information.

If the L2 cache 30 extracts the address information from the pipeline processing in this state, the address information filling the pipeline processing is sequentially processed in the L2 cache 30. Then, the processor 10 can send out the address information. The holding state at this time is indicated in each stage after the sixth cycle.

As described above, each stage of the pipeline processing communicates with only the adjacent stages (previous stage and subsequent stage) and controls to prevent the address information from being overwritten.

As described above, each stage of the pipeline processing determines the operation of the current stage based on the presence or absence of a command from the previous stage, the presence or absence of information in the subsequent stage and further the state of the current stage. The command sent from the previous stage to the current stage is controlled not so that it is sent out for the first time when a signal from the current stage is present but so that it is sent out whenever the previous stage has a command. In other words, a signal from the current stage to the previous stage is a signal indicating that the changeover to the next command is possible. This method can reduce the latency between the stages of the pipeline processing.

There will be described below a structure in which a plurality of processors are connected to the pipeline processing. In this case, arbitration is required between the processors. The arbiters 11A to 11D shown in FIG. 3 perform arbitration. There will be now described the arbiter 11A, but the construction and operation of other arbiters 11B to 11D are also similar.

Figure 7:
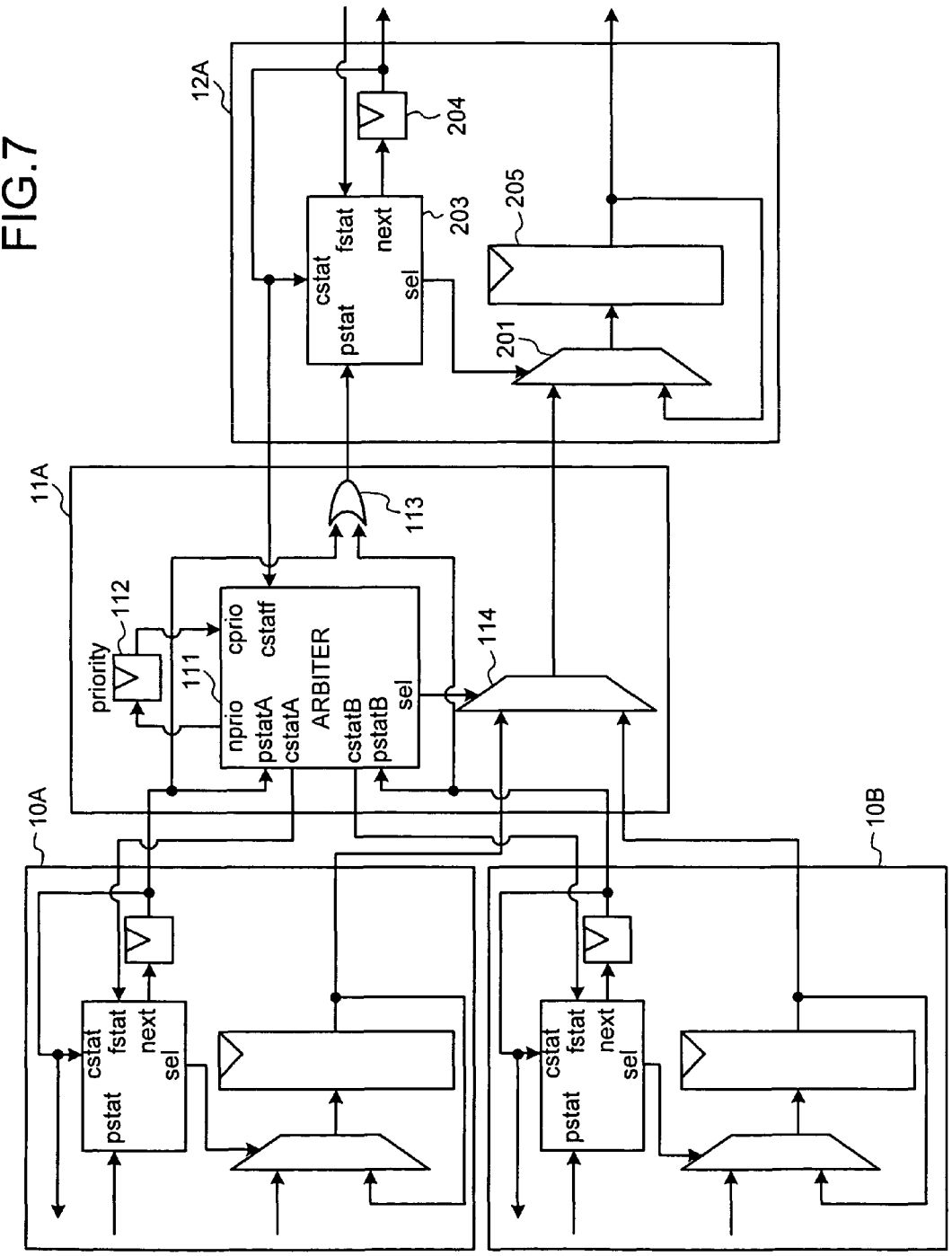
FIG. 7 is a diagram showing a detailed construction of an arbiter.

FIG. 7 is a diagram showing a detailed structure of the arbiter 11A. The arbiter 11A selects one of the inputs from the two processors 10A and 10B. The flow control circuit described with reference to FIG. 4 is utilized for the selecting one of the inputs from the two processors 10A and 10B. The arbiter 11A has an arbiter circuit 111, a flip-flip configured preference holding unit 112, an OR circuit 113 and a multiplexer 114. The construction of other arbiters 11A to 11D and the arbiter 21 is also similar.

The arbiter circuit 111 has a ptatA terminal, a ptatB terminal, a nprio terminal, a cprio terminal, a cstatA terminal, a cstatB terminal, a cstatf terminal and a sel terminal.

The ptatA terminal and the ptatB terminal assume the holding states of their previous stages or the processors 10A and 10B as input, respectively. The cstatf terminal assumes the holding state of the subsequent stage as input. The cstatA terminal and the cstatB terminal transmit the states of their subsequent stages to the two previous stages.

The preference holding unit 112 indicates a history as to which stage has been selected at the previous time, holds information on the preference, and configures so that the preference of the stage selected immediately before is lower, thereby keeping a fairness between the processors 10A and 10B. The preference holding unit 112 assumes the output of the nprio terminal as input. The cprio terminal assumes the output of the preference holding unit 112 as input. In other words, the preference holding unit 112 stores which stage has been selected previously as history, and changes the preference such that a different stage from the previous one is easily selected at the next time.

The multiplexer 114 selects the address information of one of the processors 10A and 10B based on the output of the sel terminal. The output of the sel terminal is determined based on the inputs of the ptatA terminal, the ptatB terminal and cstatf terminal in addition to the input from the cprio terminal.

FIG. 8 is a diagram showing a logic of the arbiter circuit 111. The state of the first line in FIG. 8 is a state where the address information is held in the subsequent stage. In this case, there is shown the information "x" indicating that the sel terminal may select any previous stage, but the output of the actual circuit is either 1 or 0. In this case, the multiplexer 114 selects the address information of either one.

When the holding state of either one previous stage is "f" and the holding state of the subsequent stage is "e" as in the second and third lines, the sel terminal outputs the information indicating a stage whose holding state is "f" among the previous stages.

When the holding states of the previous stages are both "f" and the holding states of the subsequent stages are "e" as shown in the fourth and fifth lines, the information indicating a stage whose preference is higher is output from the sel terminal.

For the output from the nprio terminal, the previous selecting is input from the cprio terminal as history and information is output for preferentially selecting a different stage from the previously selected stage. For example, since the address information of the processor 10B is output from the sel terminal at the second line, the information indicating that the processor 10A is taken precedence is output at the nprio terminal. "keep" indicates that the preference will not be changed.

There will be now described a physical position of the arbiter 11A. The arbiter 11A is positioned near the middle point between the previous stage and the subsequent stage in the pipeline processing. For example, in the example shown in FIG. 7, the arbiter 11A is positioned near the middle point between the processor 10A and the pipeline register 12A and near the middle point between the processor 10B and the pipeline register 12A.

In the example shown in FIG. 7, a signal line from the processors 10A and 10B via the arbiter 11A to the pipeline register 12A and a signal line from the flow controller 203 of the subsequent stage or pipeline register 12A via the arbiter 11A again to the subsequent stage or pipeline register 12A after selecting the multiplexer 114 both require to pass during one cycle. Since the cycle time is minimum when these passing have the same delay, it is desirable that the arbiter 11A is positioned near the middle point between the processors 10A and 10B and the pipeline register 12A as described above.

Although the present invention has been described using the embodiment, a variety of modifications and variations can be made to the above embodiment.

Figure 9A:
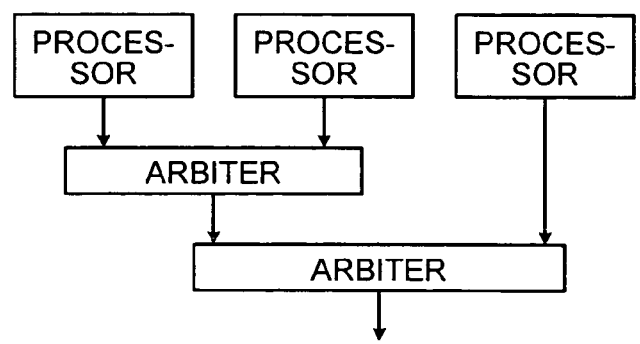
FIG. 9A is a diagram showing a first modification.
Figure 9B:
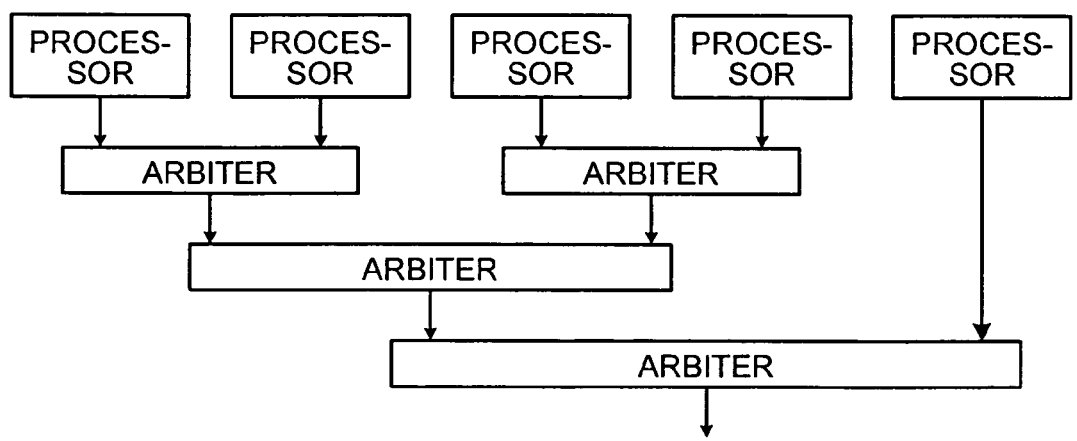
FIG. 9B is a diagram showing the first modification.

FIGS. 9A and 9B are diagrams showing a first modification. The bus system 1 according to the present embodiment has the arbiter 11 for the two processors, but it may be configured in multistage for enabling arbitration of more than two stages.

FIG. 9A shows a construction in which arbitration for three processors is possible. FIG. 9B shows a construction in which arbitration for five processors is possible. As described above, a plurality of basic constructions shown in FIG. 7 are connected so that arbitration for any number of processors can be performed.

As a second modification, the bus system 1 may be formed on the same semiconductor substrate. As another example, the bus system may be formed as a multi-chip module in which several chips are collected on a module. Further, it may be formed as a system arranged on a circuit board. Furthermore, a plurality of substrates may be rack-mounted.

As a third modification, although there has been described an example in which the address information or command is transmitted from the processor to the memory and the I/O device while being arbitrated in the present embodiment, the control method by the bus system 1 according to the present embodiment may be applied to data to be transmitted in the pipeline processing. For example, it may be used for application such as data transfer from the memory to the processor.

As a fourth modification, although the equal arbitration has been performed in the bus system 1 according to the present embodiment, the arbitration may be fixed depending on an application. Further, as another example, weighted selecting is possible and well-known arbitration algorithm may be applied.

As mentioned above, according to the present invention, the bus apparatus is capable of securely transmitting information and improving a frequency of a system even when a signal cannot be transmitted during one cycle. Also, the bus apparatus according to the present invention achieves an effect that information can be securely transmitted and a frequency of the system can be improved even when a signal cannot be transmitted during one cycle.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bus apparatus for transferring information between a bus master and a bus slave, comprising:
    a plurality of pipeline registers capable of transmitting information from the bus master to the bus slave by a pipeline processing; and
    a plurality of management devices that manage each pipeline register and are provided corresponding to the plurality of pipeline registers, respectively,
    wherein each of the management devices includes:
    a holding state keeping unit that keeps a holding state as information indicating whether a current stage's pipeline register corresponding to the management device holds information;
    an adjacent stage's holding state specifying unit to which the holding state of a previous stage's pipeline register that transmits information to the current stage's pipeline register and the holding state of a subsequent stage's pipeline register to which information from the current stage's pipeline register is transmitted are input, the adjacent stage's holding state specifying unit outputting the holding state of the current stage's pipeline register to the previous stage's pipeline register and to the subsequent stage's pipeline register; and
    a transfer control unit that determines whether information held by the corresponding pipeline register is transferred based on the holding state of the current stage's pipeline register kept by the holding state keeping unit, and the holding state of the previous stage's pipeline register and the holding state of the subsequent stage's pipeline register specified by the adjacent stage's holding state specifying unit.

2. The bus apparatus according to claim 1, wherein the bus apparatus is connected to a plurality of bus masters and further comprises:
    an arbiter that selects one pipeline register from among a plurality of pipeline registers corresponding to the plurality of bus masters, and transmits information from a selected pipeline register to a subsequent stage's pipeline register to which information from the plurality of pipeline registers is transmitted,
    wherein the holding state of the pipeline register selected by the arbiter as the holding state of the previous stage's pipeline register is input to the adjacent stage's holding state specifying unit of the management device provided corresponding to the subsequent stage's pipeline register specifies the holding state of the pipeline register selected by the arbiter as the holding state of the previous stage's pipeline register.

3. The bus apparatus according to claim 2, wherein the arbiter selects the pipeline register based on a holding state of the arbiter, the respective holding states of the plurality of pipeline registers and the holding state of the subsequent stage's pipeline register.

4. The bus apparatus according to claim 3, wherein the arbiter selects a pipeline register based on a history of a past selection by the arbiter.

5. The bus apparatus according to claim 2, wherein the arbiter is positioned near the middle point between a plurality of pipeline registers and the subsequent stage's pipeline register.

6. A bus system comprising:
    a bus master;
    a bus slave; and
    a bus apparatus that transmits information between the bus master and the bus slave,
    wherein the bus apparatus includes:
    a plurality of pipeline registers capable of transmitting information from the bus master to the bus slave by a pipeline processing; and
    a plurality of management devices that manage each pipeline register and are provided corresponding to the plurality of pipeline registers, respectively,
    wherein each of the management devices contains:
    a holding state keeping unit that keeps a holding state as information indicating whether a current stage's pipeline register corresponding to the management device holds information;
    an adjacent stage's holding state specifying unit to which the holding state of a previous stage's pipeline register that transmits information to the current stage's pipeline register and the holding state of a subsequent stage's pipeline register to which information from the current stage's pipeline register is transmitted are input, the adjacent stage's holding state specifying unit outputting the holding state of the current stage's pipeline register to the previous stage's pipeline register and to the subsequent stage's pipeline register; and
    a transfer control unit that determines whether information held by the corresponding pipeline register is transferred based on the holding state of the current stage's pipeline register kept by the holding state keeping unit, and the holding state of the previous stage's pipeline register and the holding state of the subsequent stage's pipeline register specified by the adjacent stage's holding state specifying unit.

7. The bus system according to claim 6, wherein the bus master determines whether information is send out based on the holding state of a connected pipeline register.

8. The bus system according to claim 6, wherein the bus slave determines whether information is acquired from a connected pipeline register based on whether the bus slave holds information.

9. The bus system according to claim 6, wherein the bus slave determines whether the information is acquired based on the holding state of a connected pipeline register.

10. An information transferring method in a bus apparatus for:
    transferring information between a bus master and a bus slave, wherein the bus apparatus has a plurality of management devices that manage each pipeline register and are provided corresponding to a plurality of pipeline registers capable of transmitting information from the bus master to the bus slave by a pipeline processing, respectively, the plurality of pipeline registers including a previous stage's pipeline register, a current stage's pipeline register, and subsequent stage's pipeline register;

transmitting, from the previous stage's pipeline register, information to the current stage's pipeline register;

transmitting, from the current stage's pipeline register, information to the subsequent stage's pipeline register;

inputting to each of the management devices a holding state of the previous stage's pipeline register and a holding state of the subsequent stage's pipeline register;

outputting, from each of the management devices, the holding state of the current stage's pipeline register to the previous stage's pipeline register and to the subsequent stage's pipeline register; and determining, from each of the management devices, whether to transfer information held by the corresponding pipeline register based on the holding state of the current stage's pipeline register, which is kept by a holding state keeping unit for keeping a holding state as information indicating whether a current stage's pipeline register corresponding to the management device holds information, and the holding state of the previous stage's pipeline register and the holding state of the subsequent stage's pipeline register.

11. The bus apparatus according to claim 1, wherein the transfer control unit determines that information held by the corresponding pipeline register is transferred when the holding state of current stage's pipeline register shows that the current stage's pipeline register does not hold the information, the holding state of the previous stage's pipeline register shows that the previous stage's pipeline register holds the information and the holding state of the subsequent stage's pipeline register shows that the subsequent stage's pipeline register does not hold the information.

12. The bus system according to claim 6, wherein the transfer control unit determines that information held by the corresponding pipeline register is transferred when the holding state of current stage's pipeline register shows that the current stage's pipeline register does not hold the information, the holding state of the previous stage's pipeline register shows that the previous stage's pipeline register holds the information and the holding state of the subsequent stage's pipeline register shows that the subsequent stage's pipeline register does not hold the information.

* * * * *

UNITED STATES PATENT AND TRADEMARK OFFICE
CERTIFICATE OF CORRECTION

PATENT NO. : 7,818,546 B2
APPLICATION NO. : 11/517327
DATED : October 19, 2010
INVENTOR(S) : Asano et al.

Page 1 of 1

It is certified that error appears in the above-identified patent and that said Letters Patent is hereby corrected as shown below:

Claim 7, column 10, line 52, change "is send out" to --is sent out--.

Signed and Sealed this
Fourth Day of January, 2011

David J. Kappos
*Director of the United States Patent and Trademark Office*